Figure 1:
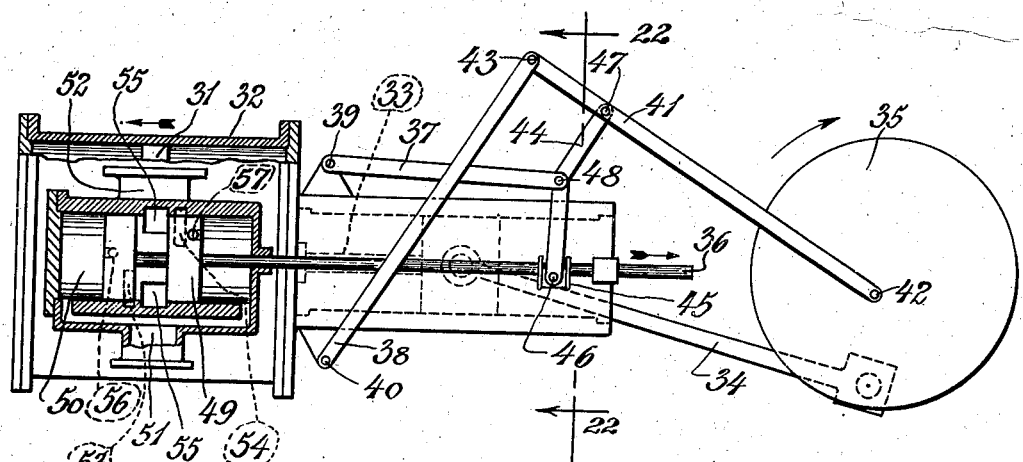

Sept. 7, 1937.   S. L. G. KNOX   2,091,996
VALVE AND VALVE GEAR FOR ENGINES
Filed Aug. 21, 1935   6 Sheets-Sheet 1

INVENTOR.
Samuel L. G. Knox.
BY Hoar Ruhloff & Arnaud
ATTORNEYS.

Sept. 7, 1937.    S. L. G. KNOX    2,091,996
VALVE AND VALVE GEAR FOR ENGINES
Filed Aug. 21, 1935    6 Sheets-Sheet 3

INVENTOR.
Samuel L.G. Knox.
BY Hoar Ruhloff & Arnaud
ATTORNEYS.

INVENTOR.
Samuel L. G. Knox
BY
ATTORNEYS.

Samuel L. G. Knox,
INVENTOR.

ATTORNEYS.

Sept. 7, 1937.  S. L. G. KNOX  2,091,996
VALVE AND VALVE GEAR FOR ENGINES
Filed Aug. 21, 1935   6 Sheets-Sheet 6
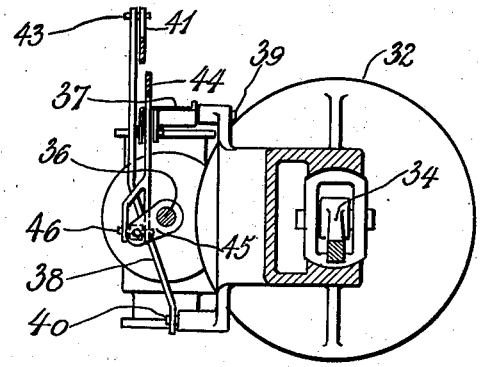
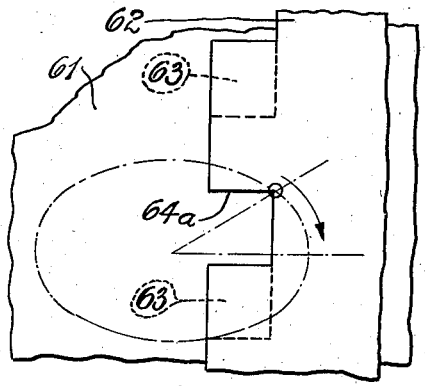
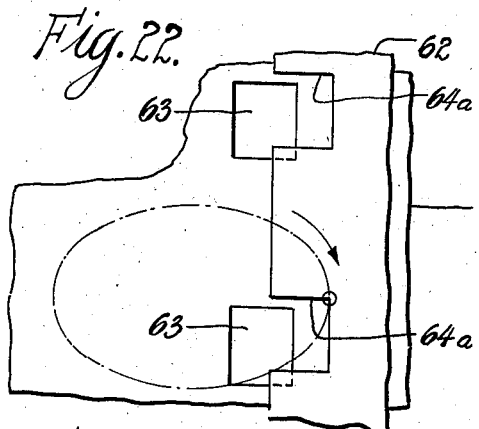
Fig. 22.
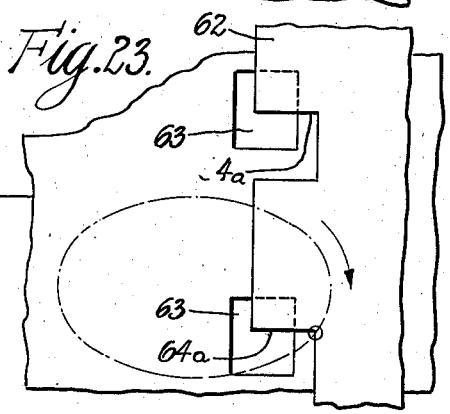
Fig. 23.
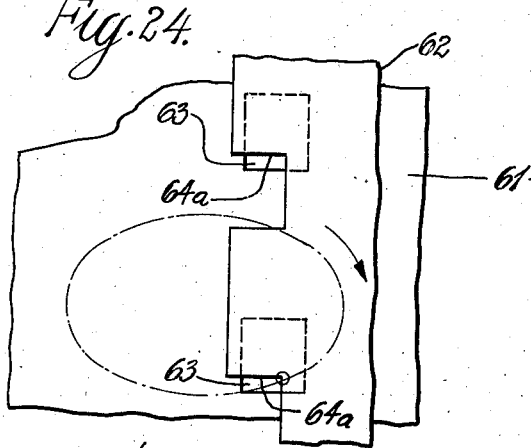
Fig. 24.
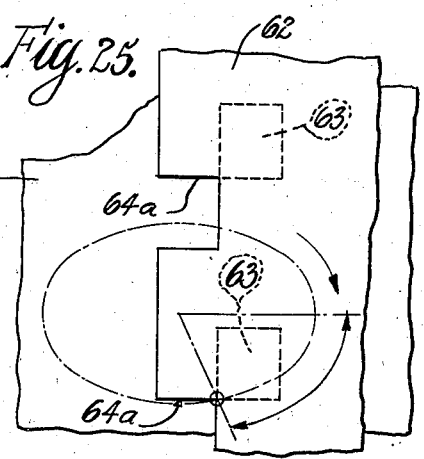
Fig. 25.
Fig. 26.
Fig. 27.
INVENTOR.
Samuel L. G. Knox.
BY Hoar, Ruhloff & Arnaud
ATTORNEYS.

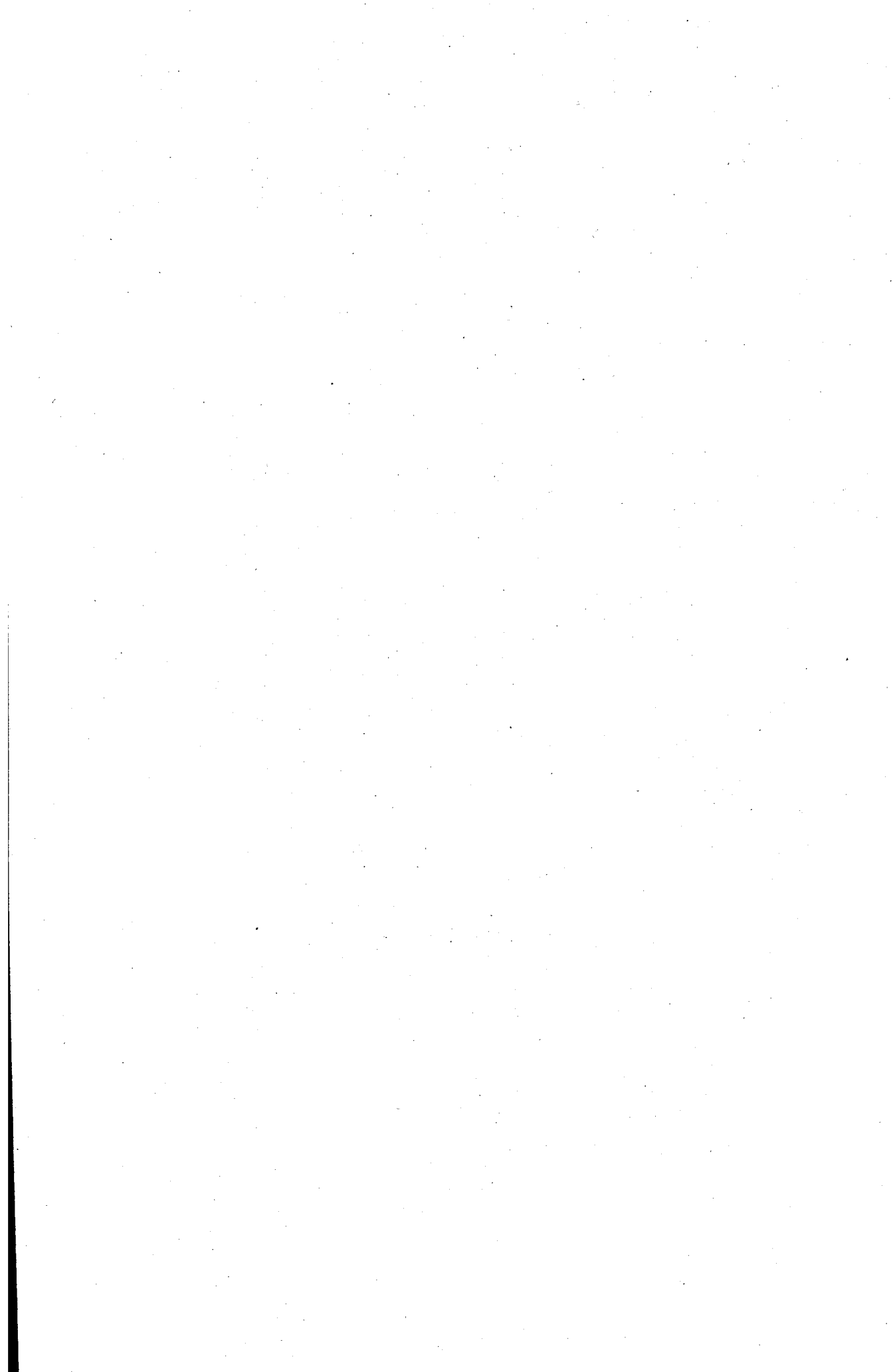

Patented Sept. 7, 1937

2,091,996

UNITED STATES PATENT OFFICE 2,091,996

VALVE AND VALVE GEAR FOR ENGINES

Samuel L. G. Knox, Englewood, N. J.

Application August 21, 1935, Serial No. 37,132

13 Claims. (Cl. 121—142)

My invention relates to new and useful improvements in valves for elastic fluid-pressure engines, and in the valve-gear associated therewith. More specifically it relates to a reciprocating valve-assembly for engines utilizing steam or air or other elastic fluid as the operating fluid. Merely for illustration, the following description relates to my invention primarily as adapted to a steam engine.

It is the principal object of my invention to provide means whereby the valve shall cut off the operating fluid (which may be steam) at a point in its return stroke, different from the point in its advance stroke at which it admits the steam, whereby to obtain certain advantageous results automatically, one of which is an effectively later cut-off during starting and when engine is slowed down during other times of relatively greater torque resistance.

Conversely, in an engine such as a multi-cylinder steam-reverse engine, as is described in my Patent 1,845,288, where the position of the eccentric is limited to a very narrow range of angular position, the present invention, reversed in its operation, can be employed to effect a shorter cut-off so as to increase the expansion ratio with consequent improved economy.

In addition to the above-stated objects, I have worked out a number of novel and useful details, which will be readily evident as the description progresses.

My invention consists in the novel parts, and in the combinations and arrangements thereof, which are defined in the appended claims; and of which three embodiments are exemplified in the accompanying drawings, which are hereinafter particularly described and explained.

Throughout the description, the same reference-number is applied to the same member or to similar members.

Referring to the drawings, it will be seen that:

Figures 1 to 8 inclusive are side elevations of one embodiment of my invention, showing the valve chamber and part of the corresponding cylinder in section. These eight figures show eight successive positions of the parts in an operating cycle.

Figure 4:
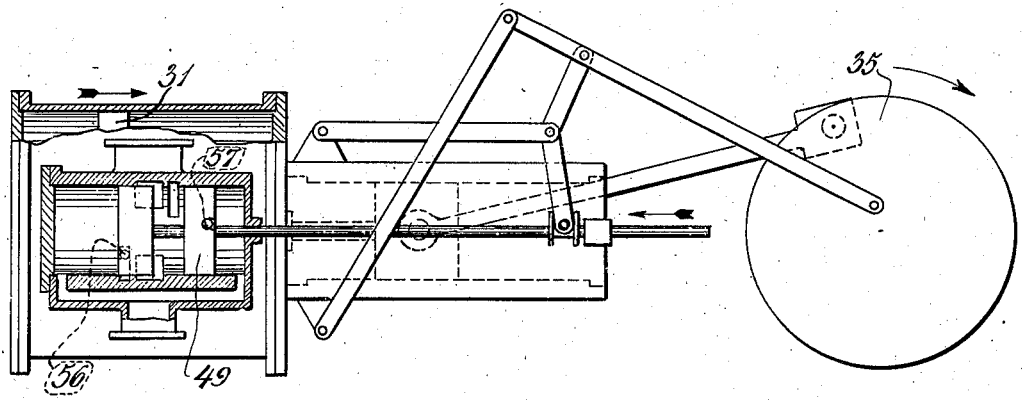
Figure 9:
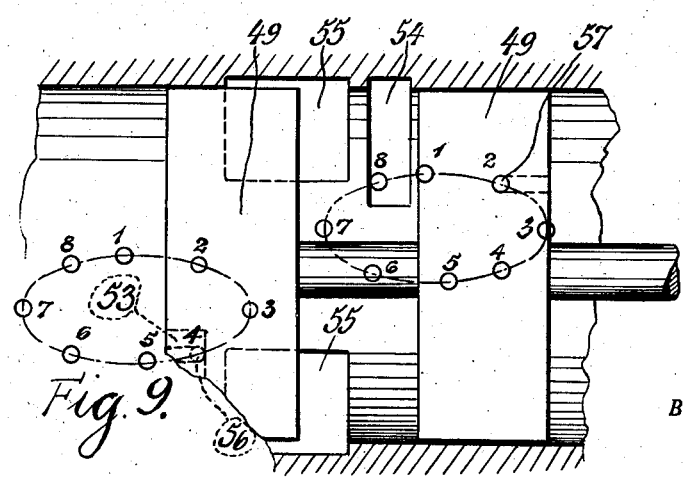

Figure 9 is an enlargement of the valve proper of Figure 4, and is for the principal purpose of illustrating the eight successive positions of each of the two "supplementary openings" in the cycle of operations.

Figures 10 to 15 inclusive are plan views of a second embodiment of my invention, showing a portion of valve-seat and valve. These six figures show six successive positions of the valve in an operating cycle.

Figures 16 to 21 inclusive are plan views of a third embodiment of my invention, showing a portion of valve-seat and valve. These figures show six successive positions of the valve in an operating cycle.

Figure 22 is an elevation, partly in section, taken along the line 22—22 in Figure 1.

Figures 23 to 27 inclusive are plan views of a slight variant of the second embodiment of my invention. These five figures show five successive positions of the valve in an operating cycle.

Referring now to the first variant, which for purposes of identification I shall call the "supplementary opening" variant, namely that of Figures 1 to 9 inclusive, I shall apply all the reference numbers to Figure 1 only. In the other figures, I shall apply only such reference numbers as may be necessary to describe the progressive operation of my device.

31 is a piston, reciprocating in steam-cylinder 32, and operating a piston-rod 33, and thereby operating a connecting-rod 34, and a crank-disk 35.

The rotation of the crank-disk 35 imparts a compound motion to valve-stem 36, by means of a linkage which will now be described.

Links 37 and 38 are respectively pivoted at fixed pivots 39 and 40.

Link 41 is pivoted at one end to the crank-disc eccentrically at 42, and the other end to link 38 at 43.

Link 44 is pivoted at one end to a projection 45 from the side of the valve-stem 36, eccentrically at 46. The other end of link 44 is pivoted at 47 to an intermediate point on link 41. Link 44 is pivoted adjacent its center at 48 to one end of link 37.

The result of all this linkage is that, as the crank-disc 35 rotates, the valve-stem 36 is given a combined reciprocating and rolling motion, which it imparts to the valve 49.

Although the particular linkage herein described and shown is not an essential part of this variant of my invention, the provision of that linkage or of some other means, to produce a combined rolling (or transverse) and reciprocating motion is essential.

The valve moves in a steam-chest 50, into each end of which steam is admitted through branched pipe 51, and from which the exhaust steam leaves by pipe 52.

For a detailed description of the valve and the ports which it covers and uncovers, turn now to Figure 9, which (as already stated) shows an enlargement of a part of Figure 4.

Port 53 leads to the left-hand end of the cylinder. Port 54 leads to the right-hand end of the cylinder. Ports 55 are exhaust-ports leading to pipe 52. For identification herein, I shall call all of the surface of the valve-seat, other than its ports, a "bridge".

The valve proper is in two parts, in each of which there is a small right-angled hole 56, 57, extending from the flat end face of the valve to the curved side of the valve. The purpose of these holes is to delay the point of cut-off during times of relatively greater torque resistance. For identification herein they will be called "supplementary openings". Both of these relatively small openings are shown at the back of the valve. With a multiplication of admission ports, the supplementary openings could be correspondingly multiplied.

My invention, in the embodiment now under discussion, inheres in the combined operation of these two supplementary openings, with the peculiar motion of my valve.

By a successive inspection of Figures 1 to 8, it will be seen that, due to the combined reciprocation and rolling motion of the valve, each supplementary opening described a substantially elliptical path on the inner curved surface of the valve-cylinder, which surface serves as a valve seat. Eight successive positions of each supplementary opening on its substantial ellipse are plotted in Figure 9, the numbers referring to the figure in which the supplementary opening occupies the numbered position.

Let us now follow the valve 49 and piston 31 through their cycle, as shown successively in Figures 1 to 8. In all the figures, the crank-disk 35 is rotating clockwise.

In Figure 1, the piston 31 is in midstroke and is moving to the left, as is indicated by the arrow above it. The valve 49 is just short of center, traveling to the right, as indicated by the arrow at the end of the valve-stem 36. All ports are closed, and neither supplementary opening is functioning.

Figure 2:
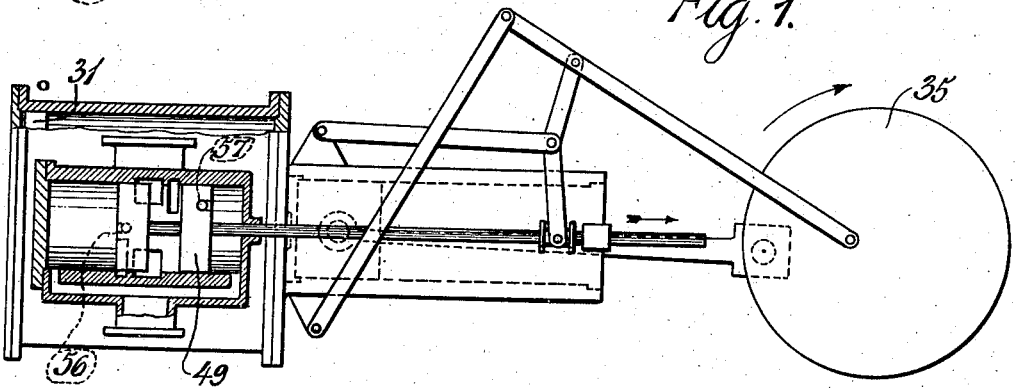

In Figure 2, the piston 31 has now traveled against compression to the left-hand end of its cylinder, and is stopped, as is indicated by the zero above it. The valve 49 has moved slightly to the right of its former position, and is just about to uncover the left-hand port to admit steam to the left-hand end of the cylinder, and has uncovered the right-hand port to permit exhaust steam to pass out through the exhaust ports. The supplementary openings are still not functioning, because supplementary opening 56, due to the orientation of the valve, is passing above port 53, and supplementary opening 57 is wholly to the right of port 54.

Figure 3:
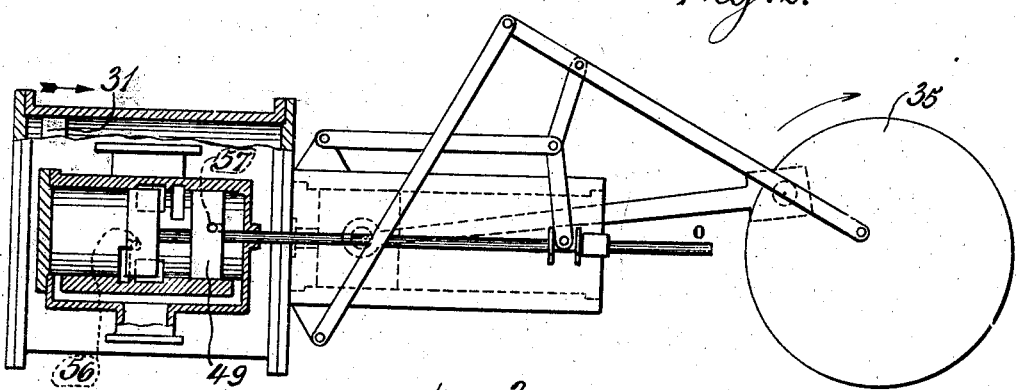

In Figure 3, the valve 49 is in its extreme right-hand position, with full admission to the left-hand end of the cylinder, and full exhaust from the right-hand end of the cylinder; and accordingly the piston 31 has begun its movement to the right. Both supplementary openings are still out of contact with their respective ports, but note that supplementary opening 56 is rolling down onto a level with port 53.

In Figure 4, the valve 49 has begun to move to the left. Exhausting from the right-hand end of the cylinder is still continuing. The left-hand admission is now closed, but the left-hand supplementary opening has now rolled downwardly, and has moved to the left into a position in which it continues to admit steam from the left-hand end of the steam-chest into the left-hand admission-port 53. It is to be noted that in Figure 4, the valve is in exactly the same position, so far as reciprocation alone is concerned, as it was in Figure 2; but, owing to its rotation, the supplementary opening 56 is in operative communication with port 53 in Figure 4, whereas in Figure 2 it was passing above it, without communicating with it. Thus we see the object of the elliptical motion of this supplementary opening.

Figure 5:
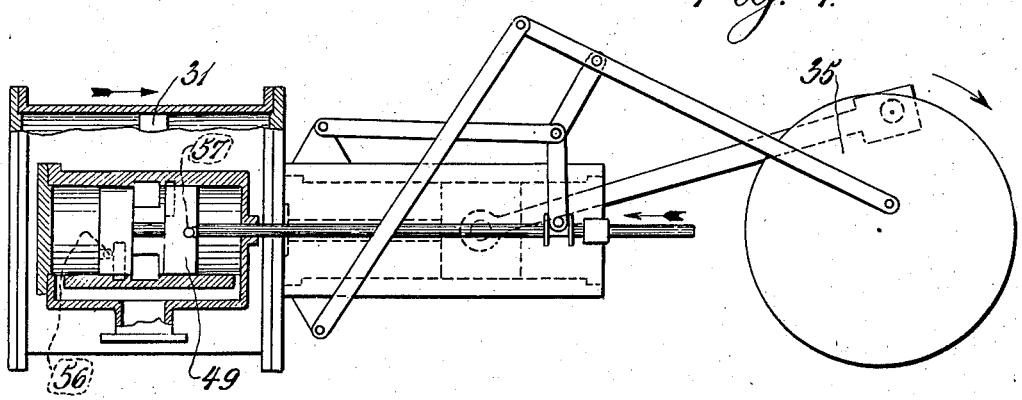

In Figure 5, the piston 31, still moving to the right, is in mid-stroke. The valve 49 is just short of center, traveling to the left. All ports are closed. The left-hand supplementary opening has just ceased to function, and the right-hand supplementary opening has not yet begun to function.

Figure 6:
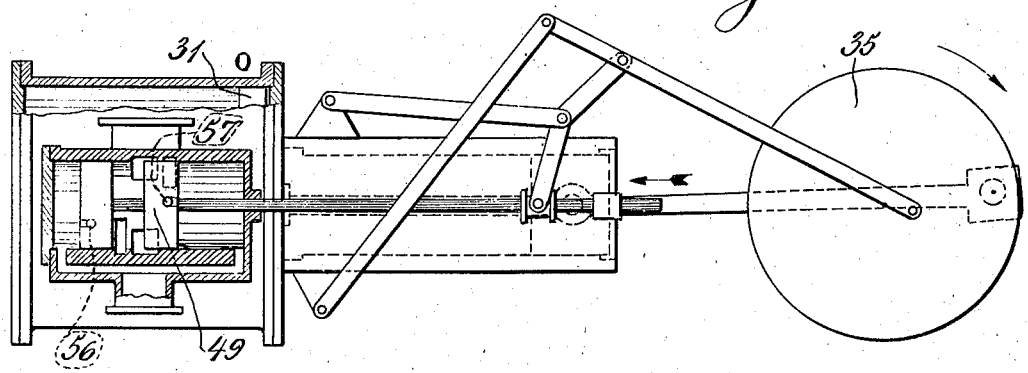

In Figure 6, the piston 31 has now traveled against compression to the right-hand end of its cylinder, and has come to a stop, as is indicated by the zero written above it. The valve 49 has moved slightly to the left of its latest position, and is just about to uncover the right-hand port to admit steam to the right-hand end of the cylinder, and has uncovered the left-hand port to permit exhaust steam to pass out through the exhaust-ports. The supplementary openings are still not functioning, because supplementary opening 57 is passing below port 54, and supplementary opening 56 is by now wholly to the left of port 53.

Figure 7:
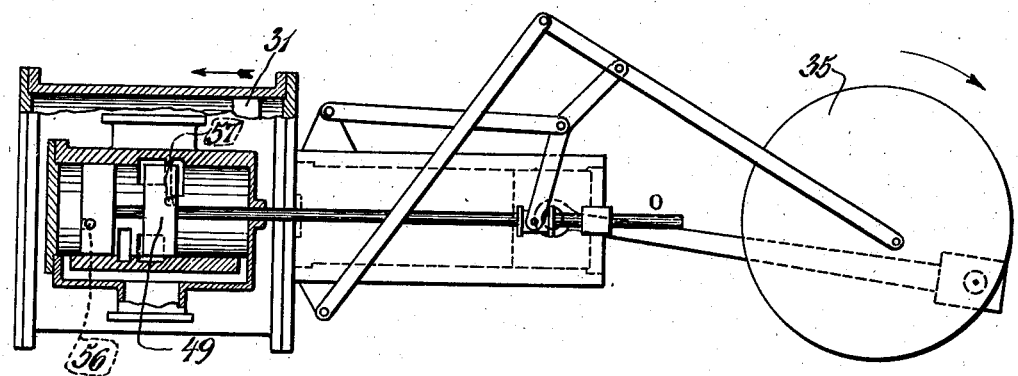

In Figure 7, the valve 49 is in its extreme left-hand position, with full admission to the right-hand end of the cylinder, and full exhaust from the left-hand end of the cylinder; and accordingly the piston 31 has begun its movement to the left. Both supplementary openings are still out of contact with their respective ports, but note that supplementary opening 57 is rolling up onto a level with port 54.

Figure 8:
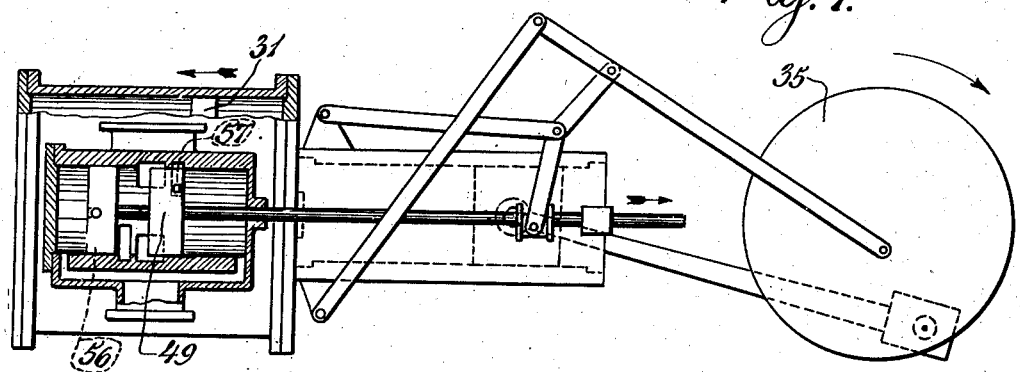

In Figure 8, the valve 49 has begun to move to the right. Exhaust from the left-hand end of the cylinder is still continuing. The right-hand admission is now closed, but the right-hand supplementary opening has now rolled upwardly and moved to the right into a position in which it continues to let steam from the right-hand end of the steam-chest into the right hand admission-port 54.

This completes the cycle. Reverting now to Figure 1, we see that all ports are closed, the right-hand supplementary opening has now ceased to function, and the left-hand supplementary opening has not yet begun to function.

Thus the eight positions may now be summarized as follows:

1. All ports closed. Supplementary openings not functioning.
2. Left-hand admission about to start. Right-hand exhaust open.
3. Left-hand admission and right-hand exhaust open.
4. Right-hand exhaust still open. Left-hand admission-ports closed, but steam still being admitted through left-hand supplementary opening, which is now functioning.
5. Everything finally closed again.
6. Right-hand admission about to start. Left-hand exhaust open.
7. Right-hand admission and left-hand exhaust open.
8. Left-hand exhaust still open. Right-hand admission-ports closed, but steam still being admitted through right-hand supplementary opening, which is now functioning.

1. Everything finally closed again.

Reverting now to the left-hand ellipse of Figure 9, we see that, owing to the action of the supplementary opening, admission to the left-hand end of the cylinder continues until the valve has traveled back to the left to a position (5) considerably beyond the position (2) at which admission began.

This delayed cut-off is one of the principal features of my invention.

Similarly, from the right-hand ellipse of Figure 9, we see that admission to the right-hand end of the cylinder continues until the valve has traveled back to the right to a position (1) considerably beyond the position (6) at which admission began.

Thus the first object of my invention is attained.

But I have made my left-hand supplementary opening sufficiently small so that, as my engine speeds up, only a diminishing amount of steam is admitted through the supplementary opening between positions 4 and 5, and thus my point of cut-off automatically shifts back towards position 4. When the engine has reached full speed, only a very small proportion of the steam passes through the supplementary opening with the result that the effective point of cut-off is shifted to a position substantially that shown in Figure 4. It is to be noted that this entire action of the supplementary opening is acomplished without altering the setting of any part. Similarly as to my right-hand supplementary opening.

It should be evident from the above description that the same result would be obtained, if the cylindrical interior of the steambox were "developed" (in the geometrical sense) to constitute a flat valve-seat, and if the valve were likewise "developed" to contact it, and then were constrained (in any convenient manner) to follow a substantially elliptical course during its reciprocation.

Similarly the supplementary opening could be cut in the form of a notch, either in the cylindrical form of my device, or in the "developed" flat form. Compare the variant of Figures 16 to 21, hereinafter discussed.

It should be evident, now that this variant of my invention has been disclosed, that any rotary motion of my cylindrical valve, regardless whether rolling back and forth as described and shown herein, or continuously rotating, would accomplish the same end, provided that it constrained my supplementary openings to trace a closed curve, properly located with respect to my admission-ports. Accordingly I use the word "rotary" in my claims in this broad sense.

This leads us to the variant of Figures 10 to 15, in which 61 is a portion of a flat valve-seat, and 62 is the corresponding portion of a flat valve. For convenience this variant will be known as the "turreted" variant.

The valve 62 is constrained (in any convenient manner) to move in a substantially elliptical path when reciprocated. To illustrate this movement, a small circle has been drawn about a given point of the valve in each of the six figures, and the course of this point has been plotted in dash-dot lines, with a curved arrow to indicate the direction of travel.

The turreted left-hand edge of the valve 62 uncovers rectangular admission-ports 63 in valve-seat 61.

Figure 10:
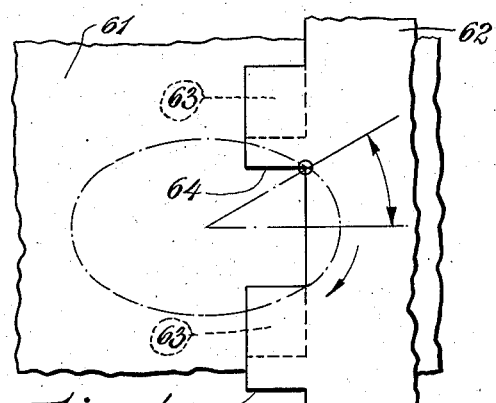

In Figure 10, admission is about to begin.

Figure 13:
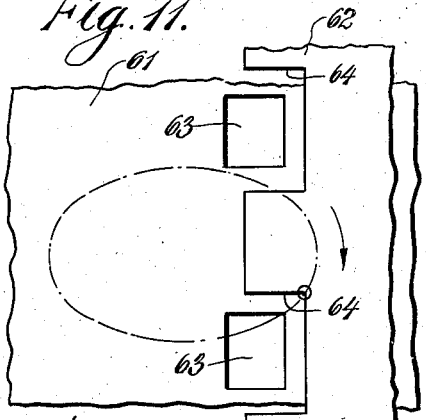
Figure 14:
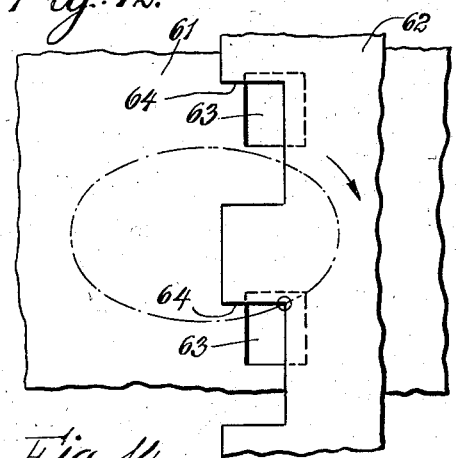
Figure 15:
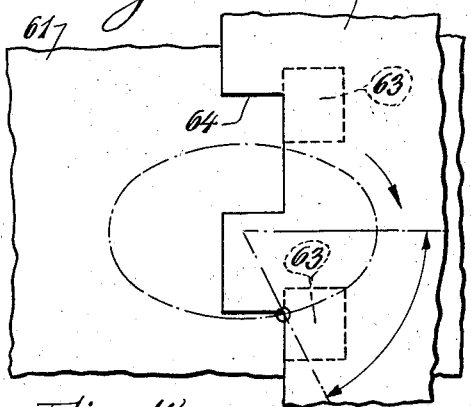

Figures 11 to 14 show successive stages of admission; and cut-off takes place in Figure 15. During the passage from the position of Figure 15 to a repetition of that of Figure 10, the ports have of course remained closed.

By comparing the angle indicated by double arrows in Figure 10, with that similarly indicated in Figure 15, it will be seen that, when cut-off occurs, the valve has traveled back to the left far beyond the position at which admission occurred when the valve was traveling to the right.

By changing the location, size and/or shape of the ports and/or of the turreted edge of the valve, it is possible to regulate the degree of opening in various positions, thereby obtaining any desired one of a wide range of characteristics of engine acceleration. For example, by shifting the edge 64 of the turrets toward the foot of the page a slight distance as shown in Figures 23 to 27, practically the same effect of admitting a diminishing amount of steam can be accomplished as with the supplementary ports of the first variant; and, as there, this occurs without the alteration of the setting of any part.

Figure 11:
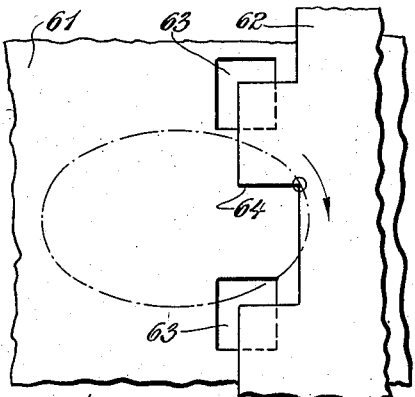
Figure 12:
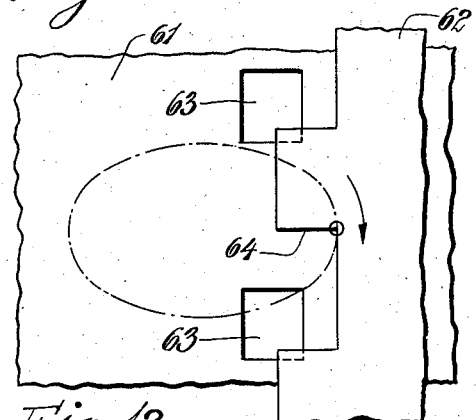

Figure 23 corresponds to Figure 10; none to Figure 11; Figure 24 to Figure 12; Figure 25 to Figure 13; Figure 26 to Figure 14; and Figure 27 to Figure 15. 64a represents the thus relocated valve-edge. It will be noticed that this relocation does not alter the degree of valve opening in the positions of Figures 10 (23), 11, 12 (24), and 15 (27); and does not appreciably alter it in the position of Figure 13 (25). Yet, in the position of Figure 14 (26), it has the effect of a supplementary opening, as in the first and third embodiments of my invention.

It should be evident from the above description that the turreted device of Figures 10 to 15, or of Figures 23 to 27, could be "enveloped" (in the geometrical sense) upon the cylindrical surface and cylindrical interior respectively of the valve and steam-chest of Figures 1 to 9.

As in the case of the first variant, I shall call that part of the valve-seat other than the ports 63, a "bridge".

This leads us to the variant of Figures 16 to 21, in which 71 is a portion of a flat valve-seat, and 72 is the corresponding portion of a flat valve. For convenience this variant will be known as the "serrated" variant.

The valve 72 is constrained (in any convenient manner) to move in a substantially elliptical path when reciprocated. To illustrate this movement, a small circle has been drawn about a given point of the valve in each of the six figures, and the course of this point has been plotted in dash-dot lines, with a curved arrow to indicate the direction of travel.

The serrated left-hand edge of the valve 72 uncovers rectangular admission-ports 73 in valve-seat 71.

Figure 16:
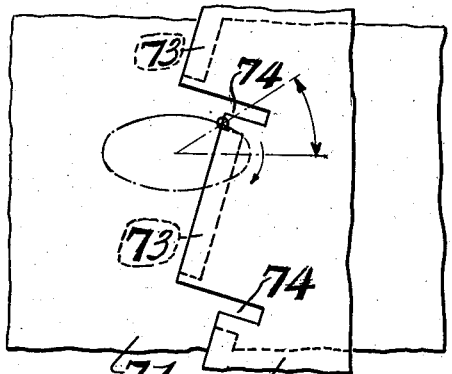

In Figure 16, admission is about to begin.

Figure 17:
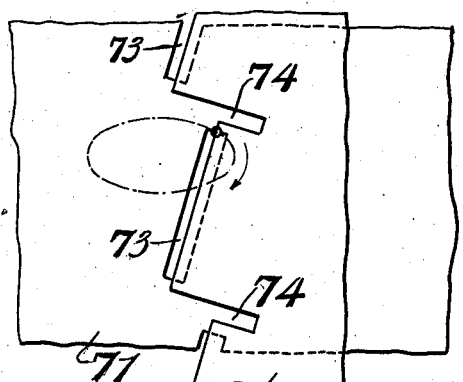
Figure 18:
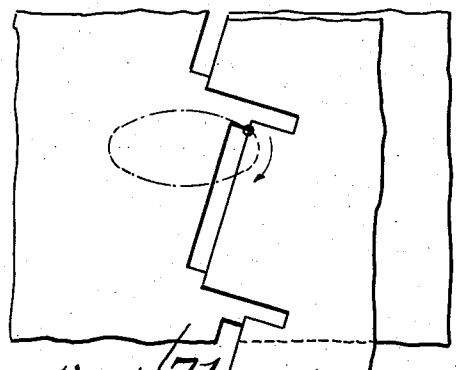
Figure 19:
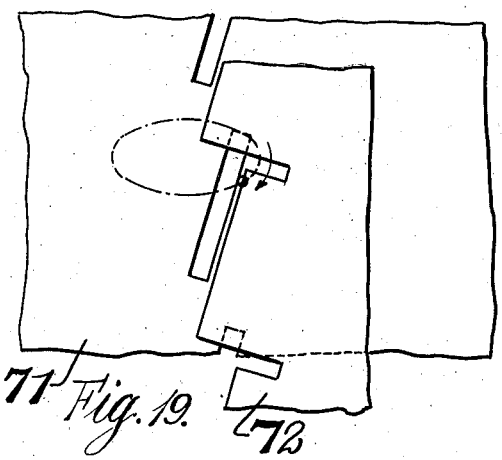
Figure 20:
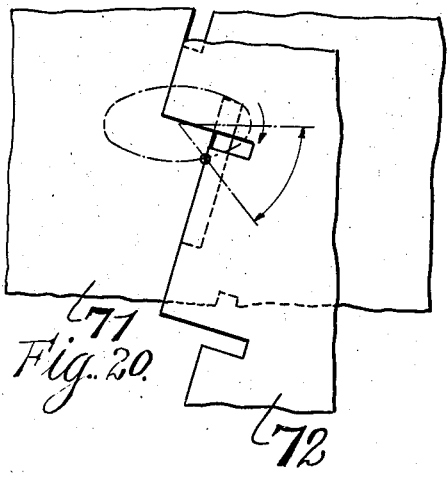
Figure 21:
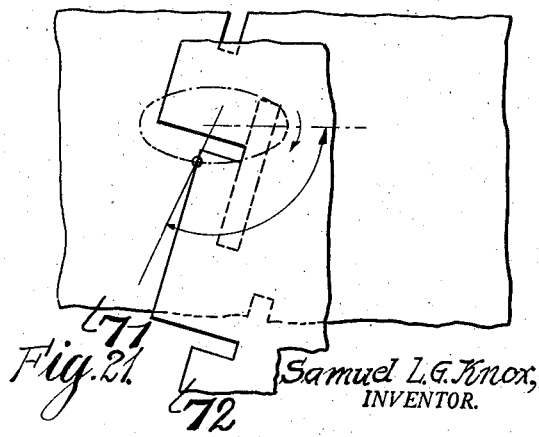

Figures 17 to 19 show successive stages of admission; and cut-off takes place in Figure 20. During the passage from the position of Figure 20 to a repetition of that of Figure 16, the ports have of course remained closed.

By comparing the angle indicated by double arrows in Figure 16, with that similarly indicated in Figure 20, it will be seen that, when cut-off occurs, the valve has traveled back to the left beyond the position at which admission occurred when the valve was traveling to the right.

By changing the location, size and/or shape